Figure 1:
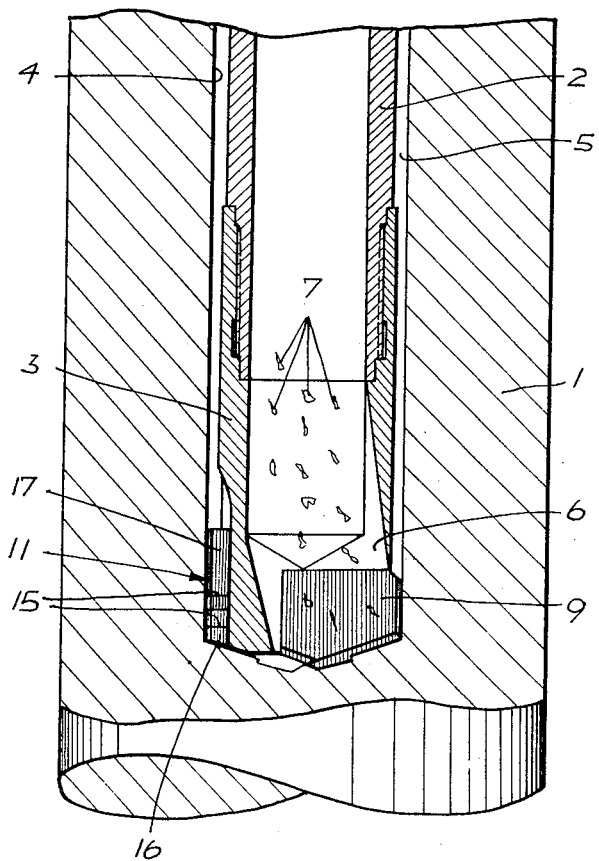

June 23, 1964  B. R. L. GREUNER  3,138,043
BORING HEAD

Filed March 19, 1962  2 Sheets-Sheet 1

INVENTOR
Bernd Reinhold Ludwig
Greuner
BY
ATTORNEY

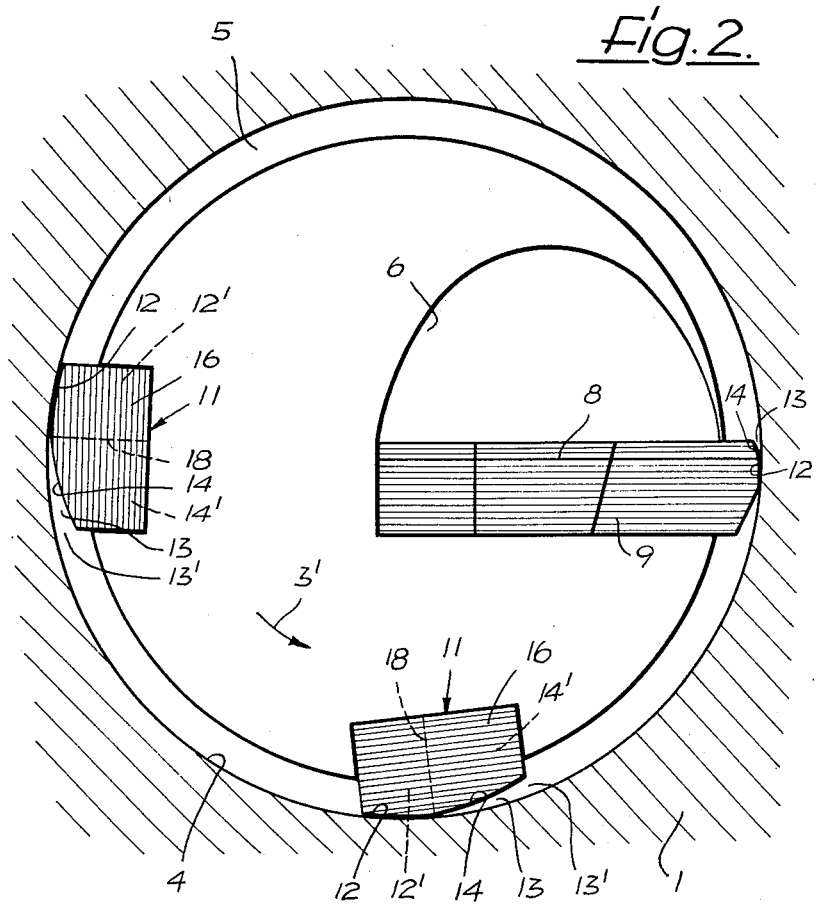

United States Patent Office 3,138,043
Patented June 23, 1964

3,138,043
BORING HEAD
Bernd Reinhold Ludwig Greuner, Bremen-Osterholz, Germany, assignor to Gebruder Heller, Kreis Verden (Aller), Germany, a firm of Germany
Filed Mar. 19, 1962, Ser. No. 180,431
Claims priority, application Germany Mar. 22, 1961
4 Claims. (Cl. 77—58)

The present invention relates to a boring head, particularly for producing deep bores. Boring heads of this type are usually provided with bearing surfaces which are formed by the cutter or by special guide or bearing members for taking up the cutting forces which are produced during the boring operation. Since the cutting forces may differ very largely in size depending upon the type of work to be carried out, the diameter of the bores to be cut, the width of the cutting edges, and the type of material to be bored, the cutters or the guide members must also be capable of taking up forces of very different sizes. The unavoidable overstresses to which the cutters and/or the guide or bearing members are often subjected then produce at first lattice-shaped fissures in the surface of the cutters or guide members which, if the stresses continue, are then torn further apart, so that finally parts of the cutters or guide members might break out. Sometimes it also happens that the material to be bored becomes welded to the cutters or guide members with the result that the boring head will be destroyed.

It is an object of the present invention to provide a boring head which overcomes all of the above-mentioned disadvantages. For attaining this object, the invention relies upon the feature of the conventional boring heads of this type that a coolant may be conducted through the gap between the boring head and the wall of the bore and also through at least one channel which is provided in the boring head. The invention then consists in providing at least a part of the bearing surface of the cutter or guide member which faces the wall of the bore with a ground surface, and in dividing this ground surface into a contact surface which extends substantially parallel to the wall of the bore and into a lead surface which together with the wall of the bore defines a feed gap of a wedge-shaped cross section through which the coolant is fed toward the contact surface under the pressure produced by the relative rotation between the boring head and the workpiece. If the generating angle of this feed gap is properly determined in accordance with hydrodynamic laws and with the pressure head of the coolant which is produced by the relative rotation between the boring head and workpiece, a hydrodynamic pressure may be produced in this feed gap which has a strength sufficient to take up completely the cutting forces which act upon the bearing surface. This hydrodynamic pressure within the wedge-shaped feed gap acts upon the bearing surface and lifts the same to such an extent off the wall of the bore that between the contact surface and the wall of the bore a thin gap is formed through which the coolant can pass. Since the mathematical principles, upon which the generating angle of the feed gap is to be calculated, are generally known in the art of hydrodynamics, a detailed description thereof will not be necessary. The present invention succeeds in attaining in a surprisingly simple manner what has previously not been possible, namely, that during the boring operation the bearing surfaces will no longer engage with the wall of the bore but will float along an oil film, and that therefore there will be practically no wear on these surfaces. Extensive tests which have been carried out with boring heads according to the invention have shown that the cutters and guide members thereof outlast many times those of all prior boring heads of this type.

While the guide members of the prior boring heads had to be made of a very hard and tough material, usually of cemented carbide, oxide ceramic materials, high-speed steel, or the like, the present invention permits the guide members to be made of less expensive and softer materials without thereby incurring any disadvantages. However, since the desired object of the invention will not be attained when the bore is first started, a preferred embodiment of the invention provides that the cutter as well as the guide member are divided by a separating surface which extends transverse to the longitudinal direction of the cutter or guide member into a head portion of a hard and tough material suitable for cutting or starting the bore and into a main portion of a softer material. Thus, that part of the cutter or guide member which is subjected to considerable wear is made of a material of an adequate hardness and toughness to withstand such wear, while the remainder may be made of a less expensive material without thereby reducing the durability of the tool.

This division of the cutter or guide member by a separating surface extending transverse to the longitudinal axis thereof may also be utilized for limiting any fissures which might develop in the head portion, for example, of a guide member, to this head portion since they cannot continue beyond this separating surface. If a fissure occurs in the head portion of the guide member after the boring head has been in use for a considerable length of time, it is merely necessary to grind off this small head portion up to the separating surface and then to shift the guide member forwardly for the distance of the part which has been ground off. The guide member may therefore be composed of a plurality of parts which form such transverse surfaces to permit the respective head portion to be ground off repeatedly from one separating surface to another. Obviously, this requires the individual parts of the guide member which might be ground off to be made of the same or similar material.

The lead surface of the entire bearing surface is practically not affected by any wear. A considerable amount of expensive material may therefore also be saved by further dividing the cutter or bearing member by another separating surface which extends substantially radially of the boring head so as to form a part of a harder material forming the contact surface and another part of a softer material forming the lead surface. It is therefore also possible to construct even the main part of the cutter or guide member of different materials and thus to reduce the cost of the boring head considerably.

The objects, features, and advantages of the present invention will become more clearly apparent from the following detailed description thereof which is to be read with reference to the accompanying drawings, in which:

FIGURE 1 shows an axial section of a boring head according to the invention, as seen during the operation of cutting a bore into a workpiece; while FIGURE 2 shows an enlarged end view of the boring head according to FIGURE 1.

In the drawings, a workpiece 1 is illustrated into which a bore 4 is to be cut by means of a boring head 3 which is secured to a boring tube 2. During the boring operation a coolant may be supplied to the cutting area through the annular gap 5 between the boring tube 2 and the boring head 3, on the one hand, and the wall of the bore 4, on the other hand. The coolant takes along the borings 7 and is discharged with them through a channel 6 which is provided in the boring head 3.

The boring head 3 as illustrated is provided with a single cutting edge 8 on a cutter 9 which is secured to a side wall of channel 6. For taking up the asymmetrical cutting forces which are produced by the cutting edge 8 during the boring operation, two guide members 11 are secured to the boring head 3. The outer ground surface of each of these guide members 11 facing the wall of bore 4 is divided in the peripheral direction thereof into a contact surface 12 and a lead surface 14 which together with the wall of the bore defines a feed gap 13 of a wedge-shaped cross section. Each guide member 11 is further divided by a transverse surface 15, as shown in FIGURE 1, into a lower head portion 16 of a hard and tough material and a main upper portion 17 of a softer material.

If the boring head 3 is rotated in the direction of the arrow 3' relative to the workpiece 1 and the outer end 13' of the feed gap 13 has a proper width which may be easily determined mathematically, the coolant contained in the annular gap 5 develops such flooding pressure that the hydrodynamic pressure which acts upon the lead surface 14 lifts the guide member 11 and thus also the contact surface 12 slightly off the wall of bore 4. Contact surface 12 will then slide along an oil film and the wear thereon will be extremely small which permits the guide member 11 to be made of a relatively inexpensive material, except for the head portion 16 of a hard and tenacious material which protects the front end of guide member 11 from being worn off or destroyed prematurely by the unavoidable stresses thereon. The head portion 16 is preferably made of a very high-grade material, and since this portion only forms a small part of guide member 11, it will not increase the cost of the boring head to any material extent.

Since the part of the main upper portion 17 of guide member 11 which forms the contact surface 12 is subjected to slightly greater stresses than the part forming the lead surface 14, the main portion 17 may be divided by a surface 18 extending in a substantially radial direction into a part 12' of a harder material forming the contact surface 12 and into a part 14' of a softer material forming the lead surface 14.

In order to attain the same effect on the outer surface of the cutter 9 as on the outer surface 12, 14 of guide members 11, this surface is likewise divided into a lead surface 14 forming a feed gap 13 and into a contact surface 12. In the boring head as illustrated, these surfaces are made relatively small since most of the cutting forces on the cutting edge 8 are transmitted to the guide members 11. In borers with several cutting edges it is, however, possible to make the cutters of the same design as the guide members 11, and they may then also be divided in the same manner by radial surfaces and by surfaces extending transverse to the longitudinal axis of the cutter.

Although my invention has been illustrated and described with reference to the preferred embodiments thereof, I wish to have it understood that it is in no way limited to the details of such embodiments, but is capable of numerous modifications within the scope of the appended claims.

I claim:
1. A boring head comprising
a body having at least two elements secured thereto,
at least one of said elements being a cutter,
each of said elements having at least one bearing surface for guiding the boring head along the wall of a bore in a workpiece and adapted to take up the cutting forces,
said elements projecting from the peripheral wall of said body of said boring head toward the inner wall of said bore by means of engaging bearing surfaces, so as to form a substantially annular gap between said body and the wall of said bore and extending peripherally between said elements,
said body defining an axial channel therein,
said annular gap and said channel being adapted to feed a coolant to said boring head,
each of said bearing surfaces defining a line extending in axial direction of said body and dividing said surface into a contact surface extending substantially coaxially to and engaging the wall of said bore and into a lead surface, and
the latter together with the wall of said bore defining a feed gap of a wedge-shaped cross section adapted to supply said contact surface with said coolant under the pressure produced by the relative rotation between said boring head and said workpiece,
said contact surface and said lead surface forming a continuous curved face, and
said lead surface providing a feeding opening for said coolant and being remote from the leading edge of said bearing surface such that hydro-dynamic pressure created during relative rotation between said boring head and the wall of said bore is sufficient to assume the radial component of the cutting forces of the boring head exerted against the contact surfaces.

2. A boring head comprising
a body having at least two elements secured thereto,
at least one of said elements being a cutter,
each of said elements having at least one bearing surface for guiding the boring head along the wall of a bore in a workpiece and adapted to take up the cutting forces,
said elements projecting from the peripheral wall of said body of said boring head toward the inner wall of said bore by means of engaging bearing surfaces, so as to form a substantially annular gap between said body and the wall of said bore and extending peripherally between said elements,
said body defining an axial channel therein,
said annular gap and said channel being adapted to feed a coolant to said boring head,
each of said bearing surfaces defining a line extending in axial direction of said body and dividing said surface into a contact surface extending substantially coaxially to and engaging the wall of said bore and into a lead surface,
the latter together with the wall of said bore defining a feed gap of a wedge-shaped cross section adapted to supply said contact surface with said coolant under the pressure produced by the relative rotation between the boring head and said workpiece,
said contact surface and said lead surface forming a continuous curved face,
said lead surface providing a feeding opening for said coolant and being remote from the leading edge of said bearing surface such that the hydro-dynamic pressure created during relative rotation between said boring head and the wall of said bore is sufficient to assume the radial component of the cutting forces of the boring head exerted against the contact surfaces, and
at least one of said elements being divided by a separating surface extending transverse to the longitudinal direction of said elements into a head portion of a hard and tough material for starting the cutting of a bore and into a main portion consisting of a softer material.

3. A boring head comprising
a body having at least two elements secured thereto,
at least one of said elements being a cutter,
each of said elements having at least one bearing surface for guiding the boring head along the wall of a bore in a workpiece and adapted to take up the cutting forces,
said elements projecting from the peripheral wall of said body of said boring head toward the inner wall of said bore by means of engaging bearing surfaces, so as to form a substantially annular gap between said body and the wall of said bore and extending peripherally between said elements,
said body defining an axial channel therein,
said annular gap and said channel being adapted to feed a coolant to said boring head, each of said bearing surfaces defining a line extending in axial direction of said body and dividing said surface into a contact surface extending substantially coaxially to and engaging the wall of said bore and into a lead surface, the latter together with the wall of said bore defining a feed gap of a wedge-shaped cross section adapted to supply said contact surface with said coolant under the pressure produced by the relative rotation between the boring head and said workpiece, said contact surface and said lead surface forming a continuous curved face, and said lead surface providing a feeding opening for said coolant and being remote from the leading edge of said bearing surface, such that the hydro-dynamic pressure created during relative rotation between said boring head and the wall of said bore is sufficient to assume the radial component of the cutting forces of the boring head exerted against the contact surfaces, and at least one of said elements being divided by a plurality of separating surfaces extending transverse to the longitudinal direction of said elements into a plurality of portions of a hard and tough material each adapted when exposed to serve as a head portion for starting the cutting of a bore, and into a body portion consisting of a softer material.

4. A boring head comprising a body having at least two elements secured thereto, at least one of said elements being a cutter, each of said elements having at least one bearing surface for guiding the boring head along the wall of a bore in a workpiece and adapted to take up the cutting forces, said elements projecting from the peripheral wall of said body of said boring head toward the inner wall of said bore by means of engaging bearing surfaces, so as to form a substantially annular gap between said body and the wall of said bore and extending peripherally between said elements, said body defining an axial channel therein, said annular gap and said channel being adapted to feed a coolant to said boring head, each of said bearing surfaces defining a line extending in axial direction of said body and dividing said surface into a contact surface extending substantially coaxially to and engaging the wall of said bore and into a lead surface, the latter together with the wall of said bore defining a feed gap of a wedge-shaped cross section adapted to supply said contact surface with said coolant under the pressure produced by the relative rotation between the boring head and said workpiece, said contact surface and said lead surface forming a continuous curved face, said lead surface providing a feeding opening for said coolant and being remote from the leading edge of said bearing surface, such that the hydro-dynamic pressure created during relative rotation between said boring head and the wall of said bore is sufficient to assume the radial component of the cutting forces of the boring head exerted against the contact surfaces, and at least one of said elements being divided by a separating surface extending substantially radially to said boring head into a part of harder material forming said contact surface and into another part of a softer material forming said lead surface.

References Cited in the file of this patent

UNITED STATES PATENTS

| | | |
|---|---|---|
| 2,869,405 | Wolfe | Jan. 20, 1959 |
| 3,033,062 | Carlstedt | May 8, 1962 |

OTHER REFERENCES

"Machinery," Nov. 18, 1948; "The Trepan Boring of Deep Holes"; pages 701, 702 relied on.

"Machinery" (Great Britain), Nov. 1, 1951, vol. 79, pages 751–758 relied on; "High-Speed Trepan Boring."

"Machinery," June 1952, vol. 58, No. 10; "High Speed Trepanning with Carbide-Tipped Tools"; pages 147 to 155 relied on.